United States Patent
Wang et al.

(10) Patent No.: US 10,521,187 B2
(45) Date of Patent: Dec. 31, 2019

(54) PRESENTING VISUAL INFORMATION ON A DISPLAY

(71) Applicant: LENOVO (Singapore) PTE. LTD., New Tech Park, SC (US)

(72) Inventors: Song Wang, Cary, NC (US); Jian Li, Chapel Hill, NC (US); Ming Qian, Cary, NC (US); Jianbang Zhang, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 184 days.

(21) Appl. No.: 15/253,390

(22) Filed: Aug. 31, 2016

(65) Prior Publication Data

US 2018/0060030 A1    Mar. 1, 2018

(51) Int. Cl.
   *G06F 3/14*    (2006.01)
   *G06F 3/16*    (2006.01)
   *G09G 5/00*    (2006.01)

(52) U.S. Cl.
   CPC .............. *G06F 3/167* (2013.01); *G06F 3/14* (2013.01); *G09G 5/005* (2013.01)

(58) Field of Classification Search
   CPC ..................................... G06F 3/14; G06F 3/17
   USPC ........... 715/728, 804, 818; 700/94; 709/203; 705/14.42; 719/322; 725/30; 382/103; 707/748; 704/235
   See application file for complete search history.

(56) References Cited

U.S. PATENT DOCUMENTS

| | | | | |
|---|---|---|---|---|
| 7,721,301 B2* | 5/2010 | Wong | ...................... | G10L 15/26 455/563 |
| 2008/0243278 A1* | 10/2008 | Dalton | .................... | H04S 7/304 700/94 |
| 2010/0017466 A1* | 1/2010 | Trauner | ................. | G16H 15/00 709/203 |
| 2010/0162294 A1* | 6/2010 | Yin | ..................... | H04L 63/0823 725/30 |
| 2010/0175026 A1* | 7/2010 | Bortner | ................. | G06F 3/0481 715/818 |
| 2010/0241507 A1* | 9/2010 | Quinn | .................... | G06Q 30/02 705/14.42 |
| 2012/0278759 A1* | 11/2012 | Curl | ....................... | G16H 40/20 715/804 |
| 2013/0124533 A1* | 5/2013 | Yadav | ..................... | G06F 17/30 707/748 |
| 2013/0322689 A1* | 12/2013 | Carmichael | ........ | G06K 9/00711 382/103 |
| 2015/0279366 A1* | 10/2015 | Krestnikov | ............. | H04W 4/70 704/235 |

* cited by examiner

*Primary Examiner* — Ruay Ho
(74) *Attorney, Agent, or Firm* — Kunzler Bean & Adamson (57) ABSTRACT

For presenting visual information on a display, a processor determines to show visual information in response to an audible command from a user. The processor further identifies a display that is viewable by the user and accessible via communication hardware. In addition, the processor presents the visual information on the display via the communication hardware.

15 Claims, 8 Drawing Sheets

215

| Response Source 250 |
|---|
| Response Rank 255 |
| Visual Information 260 |
| Audible Information 265 |

PRESENTING VISUAL INFORMATION ON A DISPLAY

BACKGROUND

Field

The subject matter disclosed herein relates to visual information and more particularly relates to presenting visual information on a display.

Description of the Related Art

A voice assistant responds to audible commands with content.

BRIEF SUMMARY

An apparatus for presenting visual information on a display is disclosed. The apparatus includes communication hardware, a processor, and a memory storing code executable by the processor. The processor determines to show visual information in response to an audible command from a user. The processor further identifies a display that is viewable by the user and accessible via the communication hardware. In addition, the processor presents the visual information on the display via the communication hardware. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1A:
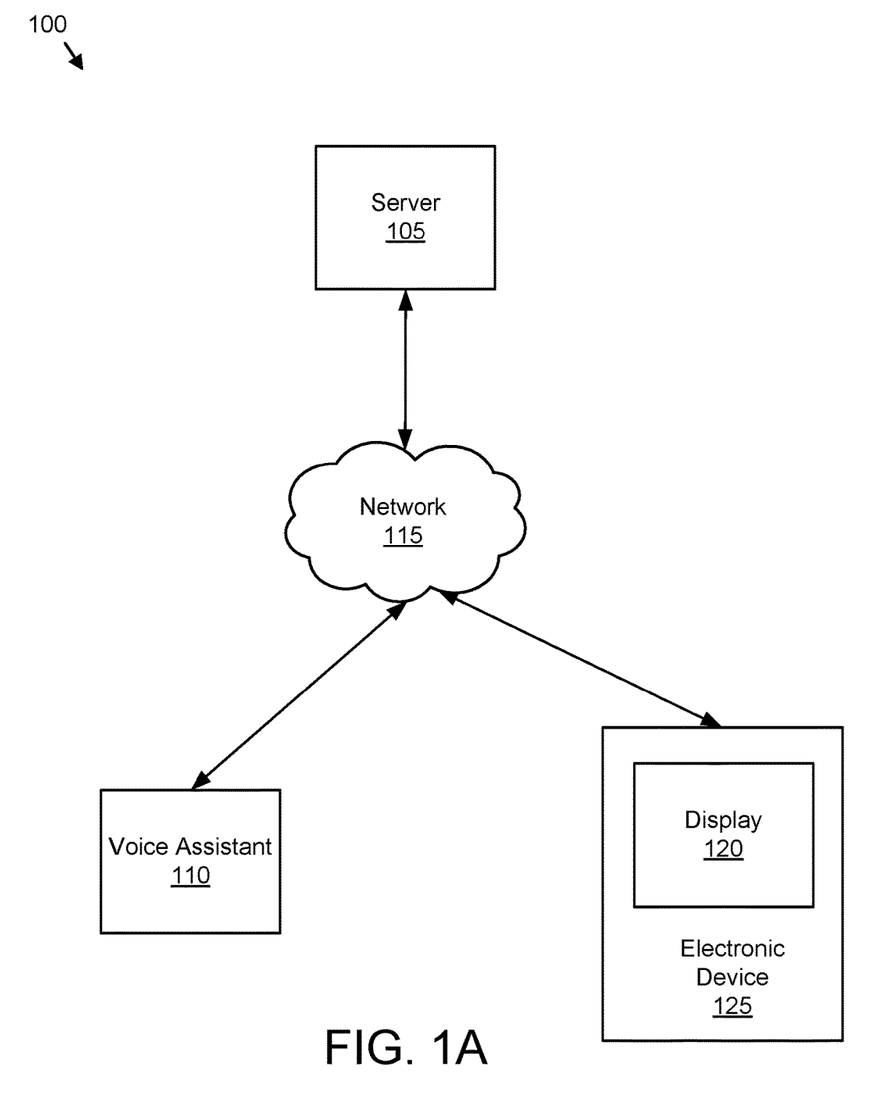
FIG. 1A is a schematic block diagram illustrating one embodiment of a voice assistant system.

FIG. 1A is a schematic block diagram illustrating one embodiment of a voice assistant system 100. The voice assistant system 100 may receive audible commands from a user and respond to each audible command. In the depicted embodiment, the voice assistant system 100 includes a server 105, a network 115, a voice assistant 110, and at least one electronic device 125.

The voice assistant 110 may receive an audible command from the user. The voice assistant 110 may process and respond to the audible command. In addition, the voice assistant 110 may communicate the audible command through the network 115 to the server 105. The network 115 may comprise one or more of the Internet, a local area network, a Wi-Fi network, a mobile phone network, a Bluetooth network, or combinations thereof. The server 105 may process the audible command and generate a response to the audible command. The server 105 may communicate the response through the network 115 to the voice assistant 110 and the voice assistant 110 may communicate the response audibly to the user.

The electronic device 125 may be separate and distinct from the voice assistant 110. The electronic device 125 may share no components with the voice assistant 110. In addition, the electronic device 125 may not be designed for integrated operation with the voice assistant 110. For example, the electronic device 125 may be a computer, a mobile phone, a television, a refrigerator, or the like. The electronic device 125 includes a display 120. The display 120 may be separate and distinct from the voice assistant 110 and/or the server 105.

The voice assistant 110 typically responds to audible commands with audible content. For example, the voice assistant 110 may present audible information such as news, a weather forecast, a shipping status, and the like in response to the audible command. In addition, the voice assistant 110 may perform a control function such as turning on a light. The voice assistant 110 may further present entertainment content such as music in response to the audible command.

Unfortunately, a suitable response to the audible command may comprise visual information. In addition, audible content may not comprise a suitable response to the audible command. The embodiments described herein determine to show visual information in response to the audible command from the user. The embodiments further identify a display such as the display 120 of the electronic device 125 that is viewable by the user and accessible via communication hardware. The embodiments may present the visual information on the display via the communication hardware as will be described hereafter.

Figure 1B:
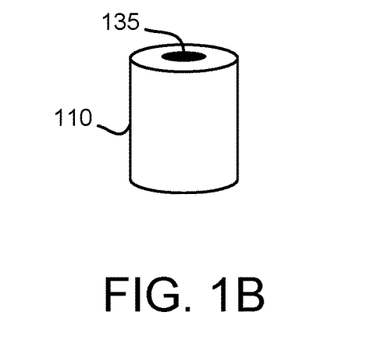
FIG. 1B is a perspective drawing illustrating one embodiment of a voice assistant.

FIG. 1B is a perspective drawing illustrating one embodiment of the voice assistant 110. In the depicted embodiment, the voice assistant 110 is a cylinder with a microphone 135. The voice assistant 110 may be organized in other embodiments and configurations. The voice assistant 110 does not include a native display. As a result, the voice assistant 110 cannot independently present visual information.

Figure 1C:
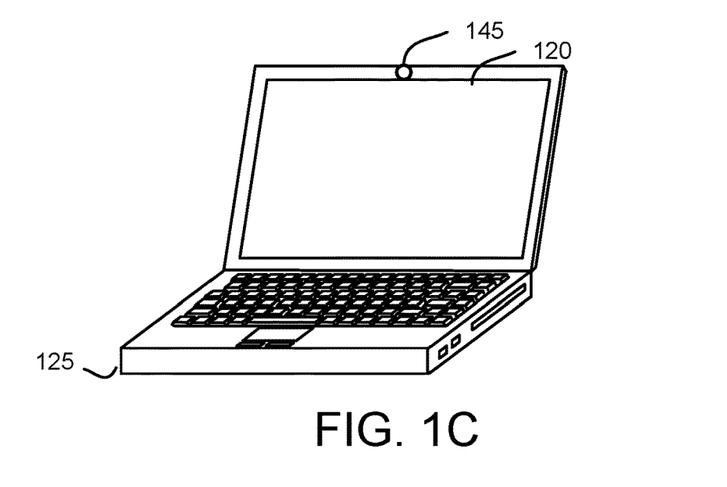
FIG. 1C is a perspective drawing illustrating one embodiment of a computer electronic device with a display.

FIG. 1C is a perspective drawing illustrating one embodiment of a computer electronic device 125. The computer electronic device 125 includes a display 120. The computer electronic device 125 may communicate with the network 115. In one embodiment, the computer electronic device 125 includes a camera 145.

Figure 1D:
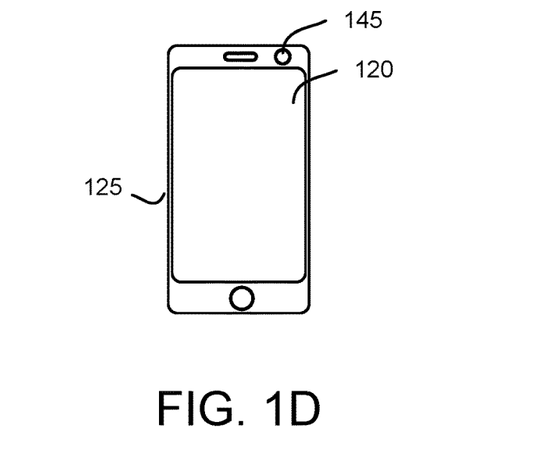
FIG. 1D is a front view drawing illustrating one embodiment of a mobile telephone electronic device with a display.

FIG. 1D is a front view drawing illustrating one embodiment of a mobile telephone electronic device 125. The mobile telephone electronic device 125 includes a display 120. The mobile telephone electronic device 125 may communicate with the network 115. In one embodiment, the mobile telephone electronic device 125 includes a camera 145.

Figure 2:
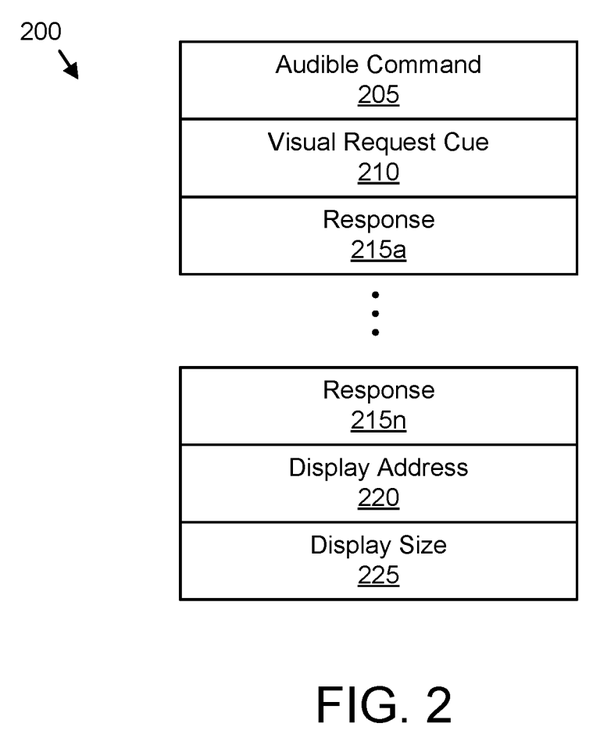
FIG. 2 is a schematic block diagram illustrating one embodiment of audible command data.

FIG. 2 is a schematic block diagram illustrating one embodiment of audible command data 200. The audible command data 200 may store an audible command 205 and information pertaining thereto. The audible command data 200 maybe organized as a data structure in a memory. In the depicted embodiment, the audible command data 200 includes the audible command 205, a visual request cue 210, a plurality of responses 215, a display address 220, and a display size 225.

The audible command 205 may record an analog signal from the microphone 135. In addition, the audible command 205 may store a digitized signal of the analog signal. In a certain embodiment, the audible command 205 stores a text version of the analog signal and/or the digitized signal.

The visual request cue 210 may record a word or phrase that indicates that the user would like a response to the audible command 205 to include visual information. Table 1 shows examples of visual request cues 210, wherein the examples are not limiting.

TABLE 1

| Show |
| Show me |
| Display |
| Present |
| Let me see |
| Let me look at |
| Illustrate |

The response 215 may each include a response generated for the audible command 205. The response 215 may include audible content, visual content, or combinations thereof. The response 215 is described in more detail in FIG. 3.

The display address 220 may include an address of a display 120 and/or an electronic device 125 that embodies the display 120. The display address 220 may include one or more of a logical address, a port address, an electronic device identifier, an electronic device credential, and the like. In one embodiment, the display address 220 includes a device identifier for the electronic device 125 and/or the display 120 hosted on the electronic device 125. For example, the device identifier "phone" may indicate a mobile telephone electronic device 125. The display address 220 may record displays 120 and/or electronic devices 125 that are been used in the past to present visual information.

The display size 225 may record dimensions of the display 120. In addition, the display size 225 may indicate a resolution of the display 120, brightness, color, and contrast parameters for the display 120, and/or a refresh rate for the display 120.

Figure 3:
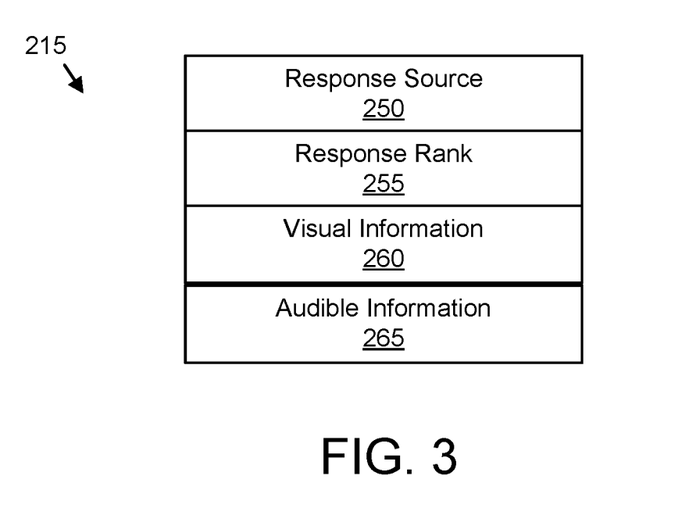
FIG. 3 is a schematic block diagram illustrating one embodiment of a response.

FIG. 3 is a schematic block diagram illustrating one embodiment of the response 215 of FIG. 2. The response 215 may be organized as a data structure in a memory. The response 215 may be generated as a possible suitable response to an audible command 205. In the depicted embodiment, the response 215 includes a response source 250, a response rank 255, visual information 260, and audible information 265.

The response source 250 may record a path to a possible response to the audible command 205. The path may be an index to a database that is stored on the server 105. Alternatively, the path may be a Universal Resource Locator (URL) to a search result that is identified as a possible response to the audible command 205.

The response rank 255 may indicate an absolute rank of the response relative to the audible command 205. For example, a response that completely satisfies the audible command 205 may have an absolute rank of 100%. Similarly, a response that only partially satisfies the audible command 205 may have an absolute rank of 10%.

Alternatively, the response rank 255 may indicate a relative rank of the response compared to other responses to the audible command 205. For example, the response rank 255 for a first response may be a 1 indicating a best and/or most suitable response while the response rank 255 for a second response may be 2 indicating a second best and/or second most suitable response.

The visual information 260 may comprise one or more of an image, a video, a table, or a graph. The visual information 260 may be a possible suitable response to the audible command 205. The audible information 265 may comprise a possible suitable audible response to the audible command 205. A response 215 may include the visual information 260, the audible information 265, or combinations thereof.

Figure 4:
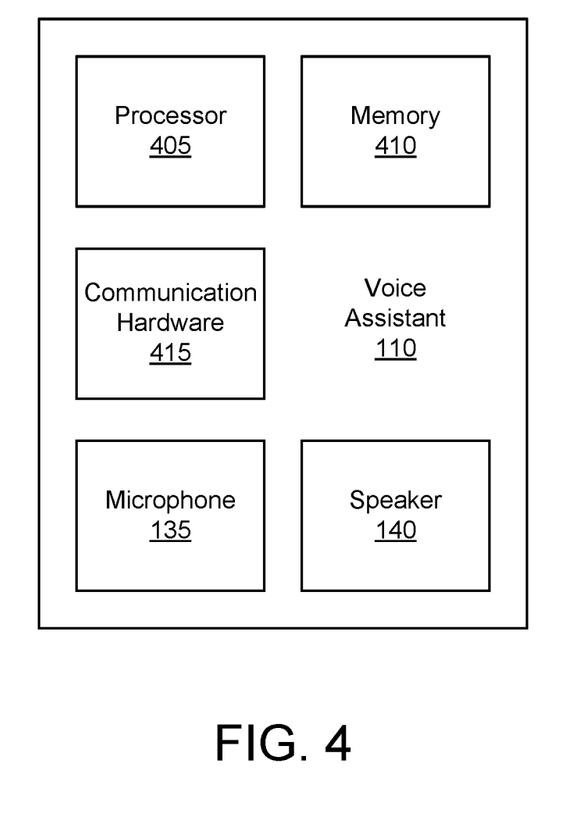
FIG. 4 is a schematic block diagram illustrating one embodiment of a voice assistant.

FIG. 4 is a schematic block diagram illustrating one embodiment of the voice assistant 110. In the depicted embodiment, the voice assistant 110 includes a processor 405, memory 410, communication hardware 415, the microphone 135, and a speaker 140. The processor 405, memory 410, and communication hardware 415 may be embodied in the voice assistant 110 and/or the server 105.

The memory 410 may include a semiconductor storage device, hard disk drive, an optical storage device, a micromechanical storage device, or combinations thereof. The memory 410 may store code. The processor 405 may execute the code.

The communication hardware 415 may communicate with other devices. In one embodiment, the communication hardware 415 communicates with the network 115. For example, the voice assistant 110 may communicate via the communication hardware 415 and the network 115 with the electronic device 125. The communication hardware 415 may include a wireless network interface, a wired network interface, and infrared network interface, or combinations thereof.

The microphone 135 may receive the audible command 205 from the user. The speaker 140 may communicate audible information 265 to the user. However, the voice assistant 110 is unable to directly communicate the visual information 260 to the user. The voice assistant 110 may identify the display 120 that is viewable by the user and accessible via the communication hardware 415 and present the visual information on the display 120 via the communication hardware 415 as will be described hereafter.

Figure 5A:
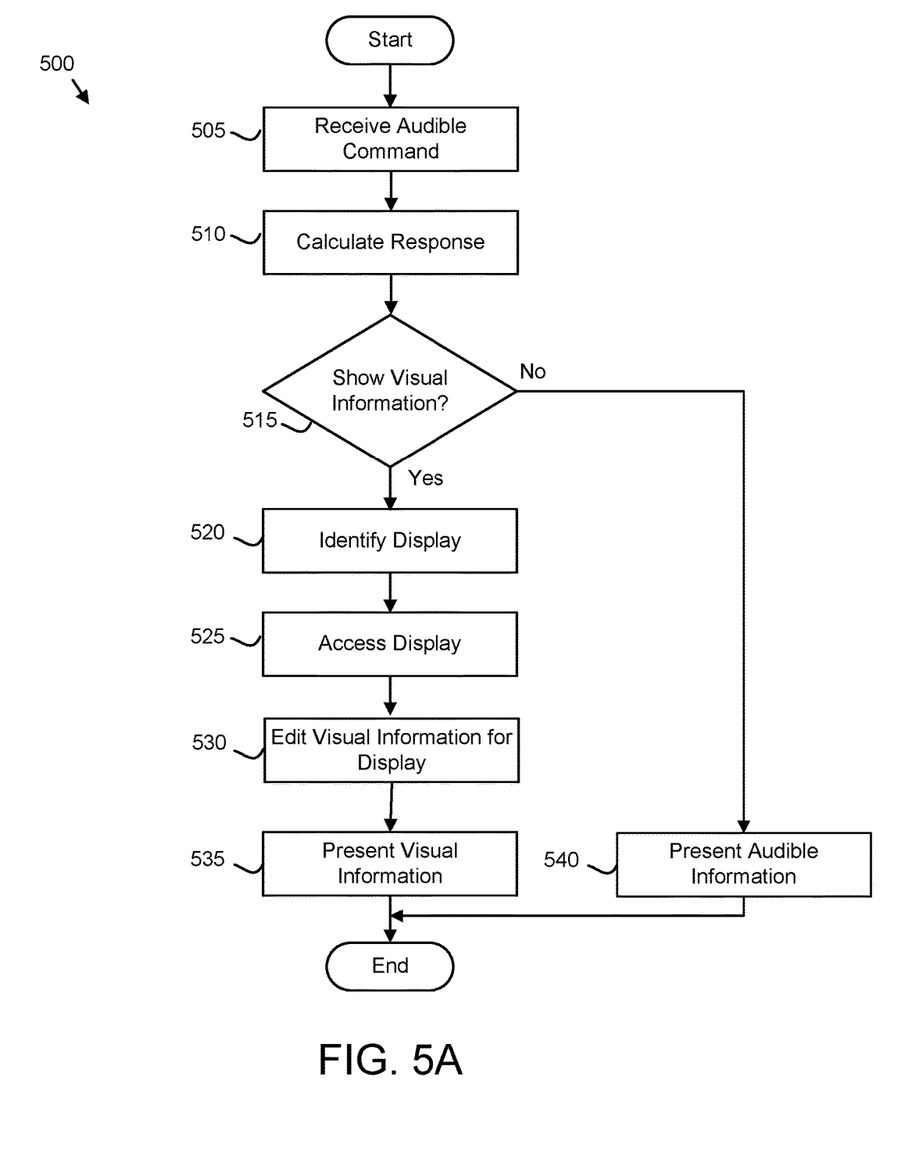
FIG. 5A is a schematic flow chart diagram illustrating one embodiment of a visual information presentation method.

FIG. 5A is a schematic flow chart diagram illustrating one embodiment of a visual information presentation method 500. The method 500 may present the visual information 260 to the user on the display 120. The method 500 may be performed by the voice assistant 110, the server 105, and/or the electronic device 125. In addition, the method 500 may be performed by the processors of the voice assistant 110 and/or the server 105.

The method 500 starts, and in one embodiment, the processor 405 receives 505 the audible command 205 from the microphone 135. The processor 405 and/or associated hardware may convert an audible signal comprising the audible command 205 to a digital signal and/or to the text representation of the audible command 205.

The processor 405 may further calculate 510 one or more responses 215 that are suitable for the audible command 205. In one embodiment, the processor 405 uses the audible command 205 as an index to access the one or more responses 215 from a database on the server 105. Alternatively, the processor 405 may use the audible command 205 as a search term and retrieve the one or more responses 215 from a search based on the search term.

The processor 405 may determine 515 whether to show the visual information 260. In one embodiment, the processor 405 determines 515 to show visual information 260 if a suitable response 215 includes the visual information 260. The determination 515 to show the visual information 260 is described in more detail in FIG. 5C. If the processor 405 determines 515 not to show the visual information 260, the processor 405 presents 540 the audible information 265 of a suitable response 215 and the method 500 ends.

If the processor 405 determines 515 to show the visual information 260, the processor 405 identifies 520 a display 120. The display 120 may be viewable by the user and accessible via the communication hardware 415. In one embodiment, the processor 405 queries local electronic devices 125 through the network 115. The processor 405 may identify 520 which electronic devices 125 include a display 120. In addition, the processor 405 may identify 520 which electronic devices 125 with displays 120 will allow the processor 405 to access the corresponding display 120. Identifying 520 the display 120 is described in more detail in FIG. 5B.

The processor 405 may access 525 the display 120. The processor 405 may access 525 the display 120 using the display address 220. For example, the processor 405 may access 525 the display 120 using a location address for the electronic device 125, a port address for the electronic device 125, an electronic device identifier, an electronic device credential. When the processor 405 has accessed 525 the display 120, the processor 405 may communicate the visual information 260 to the electronic device 125 using the display address 220.

In one embodiment, the processor 405 edits 530 the visual information 260 to conform to the display 120. The processor 405 may retrieve the data about the display 120 from the electronic device 125 and store the data in the display size 225. In addition, the processor 405 may edit 530 the visual information 260 to conform to the display size 225. In one embodiment, editing 530 the visual information 260 comprises one or more of resizing the visual information 260, cropping the visual information 260, resizing columns of the visual information 260, resizing rows of the visual information 260, adding columns to the visual information 260, and adding rows to the visual information 260.

The processor 405 may present 535 the visual information 260 on the display 120 via the communication hardware 415 and the method 500 ends. The processor 405 may communicate the visual information 260 through the communication hardware 415 and the network 115 to the electronic device 125 at the display address 220. The visual information 260 may also include the electronic device credential indicating that the electronic device 125 should display the visual information 260. The electronic device 125 may display the visual information 260 on the display 120. In one embodiment, the electronic device 125 displays the visual information 260 in response to receiving the electronic device credential.

Figure 5B:
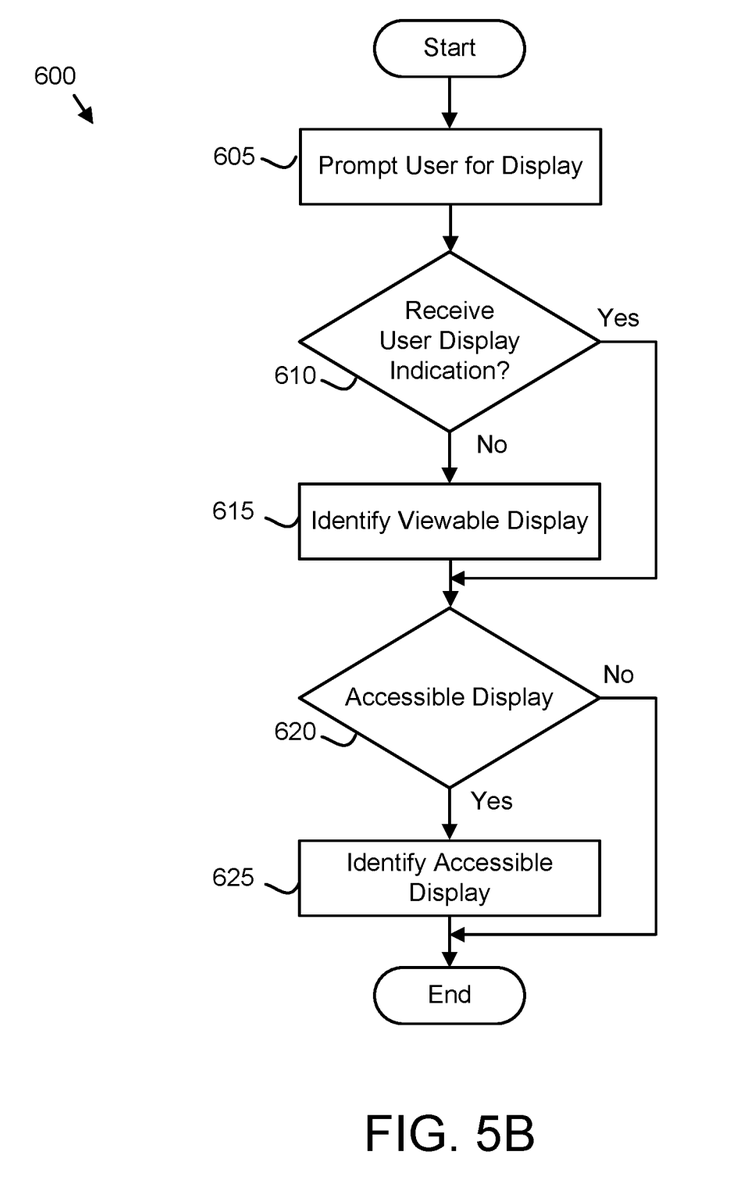
FIG. 5B is a schematic flow chart diagram illustrating one embodiment of a visual information determination method.

FIG. 5B is a schematic flow chart diagram illustrating one embodiment of a visual information determination method 600. The method 600 may determine whether to present visual information 260. In addition, the method 600 may describe step 520 of FIG. 5A. The method 600 may be performed by the voice assistant 110, the server 105, and/or the electronic device 125. In addition, the method 600 may be performed by the processors of the voice assistant 110 and/or the server 105.

The method 600 starts, and in one embodiment, the processor 405 prompts 605 the user for a display 120 on which to present the visual information 260. For example, the processor 405 may prompt 605 "I have visual information. Please indicate a display to receive the visual information." In addition, the processor 405 may communicate instructions for indicating the display 120. For example, the processor 405 may communicate that the user should activate a pairing function on the electronic device 125.

In one embodiment, the processor 405 may prompt 605 for the user to indicate whether a display 120 that is been used by the voice assistant 110 in the past should be used to present the visual information 260. For example, the processor 405 may prompt 605 "I have visual information. Shall I present the visual information on your phone?" The display address 220 may store the logical address, port address, electronic device credential, device identifier, and other information for displays 120 that is been used in the past in the display address 220.

The processor 405 may prompt 605 the user to suggest a display 120 on which to present the visual information 260. For example, the processor 405 may prompt 605 "I have visual information. Where shall I present the visual information?"

The processor 405 may determine 610 if a user display indication is received from the user. The user display indication may be the activation of a pairing function on the electronic device 125. Alternatively, the user display indication may be an audible command 205 that identifies an electronic device 125 and/or display 120. For example, the user display indication may be the phrase "on my phone" which includes the device identifier "phone." The processor 405 may identify a mobile telephone electronic device 125 in response to the device identifier "phone."

In addition, the user display indication may be an affirmative response to a suggestion to use a display 120 that is been used in the past. For example, the user may respond "yes" to the prompt "I have visual information. Shall I present the visual information on your phone?" The processor 405 may identify the mobile telephone electronic device 125 using the device identifier "phone."

If the user display indication is received, the processor determines 620 if the display 120 indicated by the user display indication is accessible as will be described hereafter. If no user display indication is received, the processor 405 identifies 615 a viewable display 120.

The processor 405 may identify 615 a viewable display 120 if the display 120 is within a viewable radius of the user. In one embodiment, the location of the display 120 is determined from a strength of communications between the electronic device 125 hosting display 120 and the voice assistant 110 and/or network 115. In addition, the processor 405 may identify 615 a viewable display 120 if the user may be identified from the camera 145 of the electronic device 125 hosting the display 120.

The processor 405 may determine 620 if the display 120 indicated by the user display indication and/or identified as a viewable display 120 is accessible. In one embodiment, the processor 405 determines 620 if the display address 220 includes information for accessing the electronic device 125 hosting the display 120.

Alternatively, the processor 405 may query the electronic device 125 hosting the display 120. The processor 405 may generate the display address 220 for the electronic device 125 using information received in response to the query. In one embodiment, the display 120 is accessible if the electronic device 125 hosting the display 120 provides the electronic device credential.

If the display 120 is not accessible, the method 600 ends. If the display 120 is accessible, the processor 405 may identify 625 the accessible display 120 and the method ends. In one embodiment, a plurality of accessible displays 120 are identified and presented to the user in the menu. The user may select one of the accessible displays 120 and the selected display 120 is identified 625 as the accessible display 120.

Figure 5C:
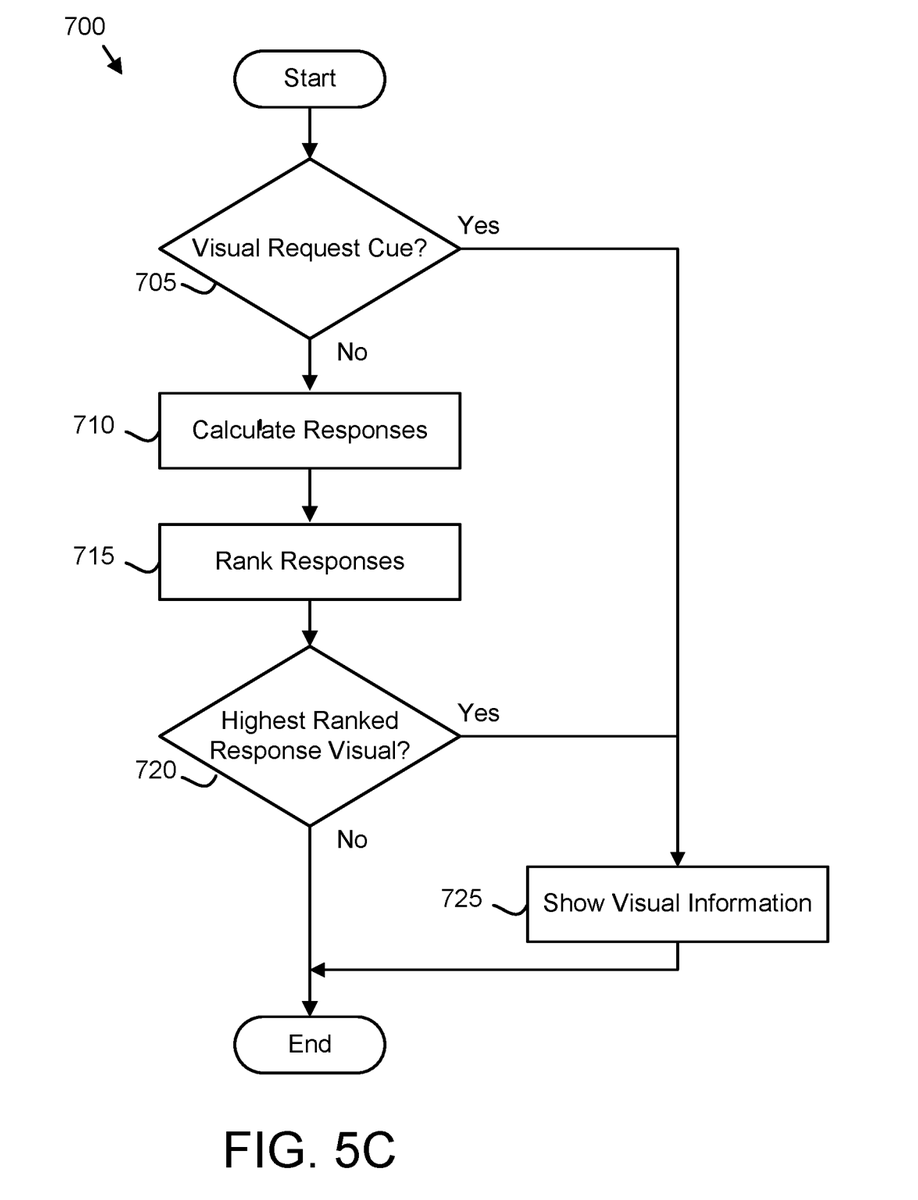
FIG. 5C is a schematic flow chart diagram illustrating one embodiment of a visual information selection method.

FIG. 5C is a schematic flow chart diagram illustrating one embodiment of a visual information selection method 700. The method 700 may determine whether to show visual information 260 in response to the audible command 205. In addition, the method 700 may perform step 515 of FIG. 5A. The method 700 may be performed by the voice assistant 110, the server 105, and/or the electronic device 125. In addition, the method 700 may be performed by the processors of the voice assistant 110 and/or the server 105.

The method 700 starts, and in one embodiment, the processor 405 determines 705 if a visual request cue 210 is received by the voice assistant 110. If the visual response cue 210 is received, the processor 405 may show 725 visual information 260 in response to the audible command 205 and the method 700 ends. In one embodiment, the processor 405 will calculate a response 215 to the audible command 205 that includes visual information 260.

If a visual request cue 210 is not received, the processor 405 may calculate 710 a plurality of responses 215 to the audible command 205. The processor 405 may calculate 710 the plurality of responses 215 as described in step 510 of FIG. 5A.

The processor 405 may further rank 715 the plurality of responses by calculating the response rank 255 for each response 215. Each response rank 255 may be calculated as a function of the audible command 205 and/or the response 215.

The processor 405 may determine 720 if the highest ranked response 215 to the audible command 205 comprises visual information 260. If the highest ranked response 215 to the audible command 205 comprises visual information 260, the processor 405 may determine to show 725 the highest ranked response 215 and the visual information 260 and the method 700 ends. If the highest rank response 215 to the audible command 205 does not include visual information 260, the method 700 ends. In addition, the processor 405 may present the audible information 265 for the highest ranked response 215 to the user.

The embodiments determine to show visual information 260 in response to an audible command 205 from the user. The embodiments may determine to show the visual information 260 if a suitable response 215 includes the visual information 260. The determination to show the visual information 260 may be because a response 215 with visual information 260 is highest ranked. Alternatively, the determination to show the visual information 260 may be in response to a visual request cue 210.

The embodiments further identify a display 120 that is viewable by the user and accessible via the communication hardware 415 of the voice assistant 110. The voice assistant 110 lacks a native display 120, necessitating the use of a display 120 hosted by another electronic device 125. The embodiments present the visual information 260 on the display 120 of the electronic device 125 via the communication hardware 415, enabling the user to receive the visual information 216 in response to the audible command 205.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
communication hardware;
a processor;
a memory that stores code executable by the processor to:
calculate a plurality of responses to an audible command from a user to the apparatus, wherein the apparatus communicates audible responses to the user;

determine to show visual information for a highest ranked response in response to the audible command;

identify an electronic device distinct from the apparatus with a display that is viewable by the user and accessible via the communication hardware, wherein the display is determined to be viewable based on strength of Bluetooth communications between the communication hardware and the electronic device;

edit the visual information to conform to the display, wherein editing the visual information comprises one or more of resizing the visual information, cropping the visual information, resizing columns of the visual information, resizing rows of the visual information, adding columns to the visual information, and adding rows to the visual information; and present the visual information on the display on the electronic device via the communication hardware.

2. The apparatus of claim 1, wherein the visual information comprises one or more of an image, a video, a table, and a graph.

3. The apparatus of claim 1, wherein the processor determines to show the visual information if the audible command comprises a visual request cue.

4. The apparatus of claim 1, wherein the processor determines to show the visual information if a highest ranked response to the audible command comprises the visual information.

5. The apparatus of claim 1, wherein audible command data for the audible command comprises one or more of a visual request cue, one or more responses, a display address for the display, and a display size for the display.

6. A method comprising:

calculating, by use of a processor, a plurality of responses to an audible command from a user to a voice assistant, wherein the voice assistant communicates audible responses to the user;

determining to show visual information for a highest ranked response in response to the audible command;

identifying an electronic device distinct from the voice assistant with a display that is viewable by the user and accessible via communication hardware, wherein the display is determined to be viewable based on strength of Bluetooth communications between the communication hardware and the electronic device;

editing the visual information to conform to the display, wherein editing the visual information comprises one or more of resizing the visual information, cropping the visual information, resizing columns of the visual information, resizing rows of the visual information, adding columns to the visual information, and adding rows to the visual information; and presenting the visual information on the display on the electronic device via the communication hardware.

7. The method of claim 6, wherein the visual information comprises one or more of an image, a video, a table, and a graph.

8. The method of claim 6, wherein the method determines to show the visual information if the audible command comprises a visual request cue.

9. The method of claim 6, wherein the method determines to show the visual information if a highest ranked response to the audible command comprises the visual information.

10. The method of claim 6, wherein audible command data for the audible command comprises one or more of a visual request cue, one or more responses, a display address for the display, and a display size for the display.

11. A program product comprising a computer readable storage medium that stores code executable by a processor, the executable code comprising code to:

calculate a plurality of responses to an audible command from a user to a voice assistant, wherein the voice assistant communicates audible responses to the user;

determine to show visual information for a highest ranked response in response to the audible command;

identify an electronic device distinct from the voice assistant with a display that is viewable by the user and accessible via communication hardware, wherein the display is determined to be viewable based on strength of Bluetooth communications between the communication hardware and the electronic device;

edit the visual information to conform to the display, wherein editing the visual information comprises one or more of resizing the visual information, cropping the visual information, resizing columns of the visual information, resizing rows of the visual information, adding columns to the visual information, and adding rows to the visual information; and present the visual information on the display on the electronic device via the communication hardware.

12. The program product of claim 11, wherein the visual information comprises one or more of an image, a video, a table, and a graph.

13. The program product of claim 11, wherein the processor determines to show the visual information if the audible command comprises a visual request cue.

14. The program product of claim 11, wherein the processor determines to show the visual information if a highest ranked response to the audible command comprises the visual information.

15. The program product of claim 11, wherein audible command data for the audible command comprises one or more of a visual request cue, one or more responses, a display address for the display, and a display size for the display.

* * * * *